(12) United States Patent
Elliott

(10) Patent No.: US 8,880,896 B1
(45) Date of Patent: Nov. 4, 2014

(54) SYSTEMS AND METHODS FOR MEDIUM ACCESS CONTROL WITH KEY AGREEMENT

(75) Inventor: Brig Barnum Elliott, Arlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2490 days.

(21) Appl. No.: 10/800,017

(22) Filed: Mar. 15, 2004

(51) Int. Cl.
*H04L 29/06* (2006.01)
*H04L 9/08* (2006.01)

(52) U.S. Cl.
CPC ............ *H04L 63/061* (2013.01); *H04L 9/0838* (2013.01)
USPC .......................................................... 713/185

(58) Field of Classification Search
CPC ...... H04L 9/0838; H04L 63/04; H04L 63/061
USPC .................... 713/158, 185; 380/262
See application file for complete search history.

(56) References Cited

U.S. PATENT DOCUMENTS

| | | | | |
|---|---|---|---|---|
| 5,225,664 A | * | 7/1993 | Iijima | 235/380 |
| 5,909,491 A | * | 6/1999 | Luo | 380/270 |
| 5,966,449 A | * | 10/1999 | Iwamura et al. | 380/44 |
| 2003/0119484 A1 | * | 6/2003 | Adachi et al. | 455/411 |
| 2003/0163691 A1 | * | 8/2003 | Johnson | 713/168 |
| 2003/0182566 A1 | * | 9/2003 | Kohara et al. | 713/193 |
| 2004/0068653 A1 | * | 4/2004 | Fascenda | 713/168 |

* cited by examiner

*Primary Examiner* — Michael S McNally

(57) ABSTRACT

Systems and methods are disclosed for controlling medium access. In one embodiment, the method includes receiving a first message including a first integer and a first sequence number; sending a second message including a second integer and the first sequence number; determining a first encryption key based on the first sequence number; and receiving a third message including a second sequence number and data, the second sequence number identifying a second encryption key capable of decoding the third message.

62 Claims, 9 Drawing Sheets

US 8,880,896 B1

SYSTEMS AND METHODS FOR MEDIUM ACCESS CONTROL WITH KEY AGREEMENT

BACKGROUND OF THE INVENTION

I. Field of the Invention

The present invention generally relates to communication systems and, in particular, to systems and methods for medium access control on a wireless network.

II. Background Information

Currently, a data processor, such as a computer, can communicate over a wireless medium using a variety of protocols. One such protocol is defined by Wireless LAN [Local Area Network] Medium Access Control (MAC) and Physical Layer (PHY) Specifications, ANSI/IEEE Standard 802.11, 1999 (referred to herein as "802.11-1999") and its supplements, such as Wireless LAN Medium Access Control (MAC) and Physical Layer (PHY) Specifications: Higher Speed Physical Layer Extension in the 2.4 GHz Band, IEEE Standard 802.11b, 1999 (referred to herein as "802.11b"). IEEE 802.11-1999 and its supplements are collectively referred to as "IEEE 802.11." Using IEEE 802.11, a computer can send data to or receive data from another computer (or processor) over a wireless media.

FIG. 11 depicts an exemplary known wireless message exchange between two computers labeled A and B. Referring to FIG. 11, to send data, computer A first sends a Request To Send (RTS) message to computer B. If computer B receives the RTS message and is willing to accept data from computer A, computer B sends a Clear To Send (CTS) message over a wireless media (e.g., air) which forms a network. When computer A receives the CTS message, it responds by sending data to computer B. Computer B may then send an Acknowledgement (ACK) message once it has received the data sent by computer A. Computer B may further process the data locally or may forward the data to another network, computer, and/or processor. Moreover, the message sequence depict in FIG. 11 may occur whenever computer A has data for computer B. Furthermore, computer B may initiate a similar message sequence by sending a RTS message to computer A. With the aforementioned message exchange, another computer can read and/or intercept data that is sent from computer A to computer B. Accordingly, systems and methods are needed that improve security and, in particular, provide security over wireless networks.

SUMMARY OF THE INVENTION

Accordingly, the present invention is directed to systems and methods for media access control on a wireless network. More particularly, the present invention is directed to improving security on a wireless network by using a sequence number to identify an encryption key used to encrypt data.

Systems and methods consistent with the present invention may receive a first message including a first integer and a first sequence number; send a second message including a second integer and the first sequence number; determine a first encryption key based on the first sequence number; and receive a third message including a second sequence number and data, the second sequence number identifying a second encryption key capable of decoding the third message.

In another embodiment, systems and methods consistent with the present invention may receive a request to send message, the request to send message including a first random integer and a first sequence number; send, in response to the received request to send message, a clear to send message including a second random integer and the first sequence number, the first and second random integers representative of public keys used to determine a shared secret key; receive a data message including a second sequence number and data encrypted a second encryption key identifiable by the second sequence number; and send, in response to the received data message, an acknowledgement message.

Additional features and advantages of the invention will be set forth in part in the description that follows or may be learned by practice of the invention. The features and advantages of the invention may be realized and attained by the system and method particularly described in the written description, the appended drawings, and the claims.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and aspects of the present invention and, together with the description, explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Systems and methods consistent with the present invention may exchange messages that include a sequence number to identify an agreed upon encryption key used to encrypt data. By using the sequence number, a sending computer and a receiving computer can each store one or more encryption keys and then send encrypted data and a sequence number identifying which key was used to encrypt the data. On the receive-side, the computer receiving the encrypted data and the sequence number can identify the appropriate encryption key based on the received sequence number used to index the encryption key.

Figure 1:
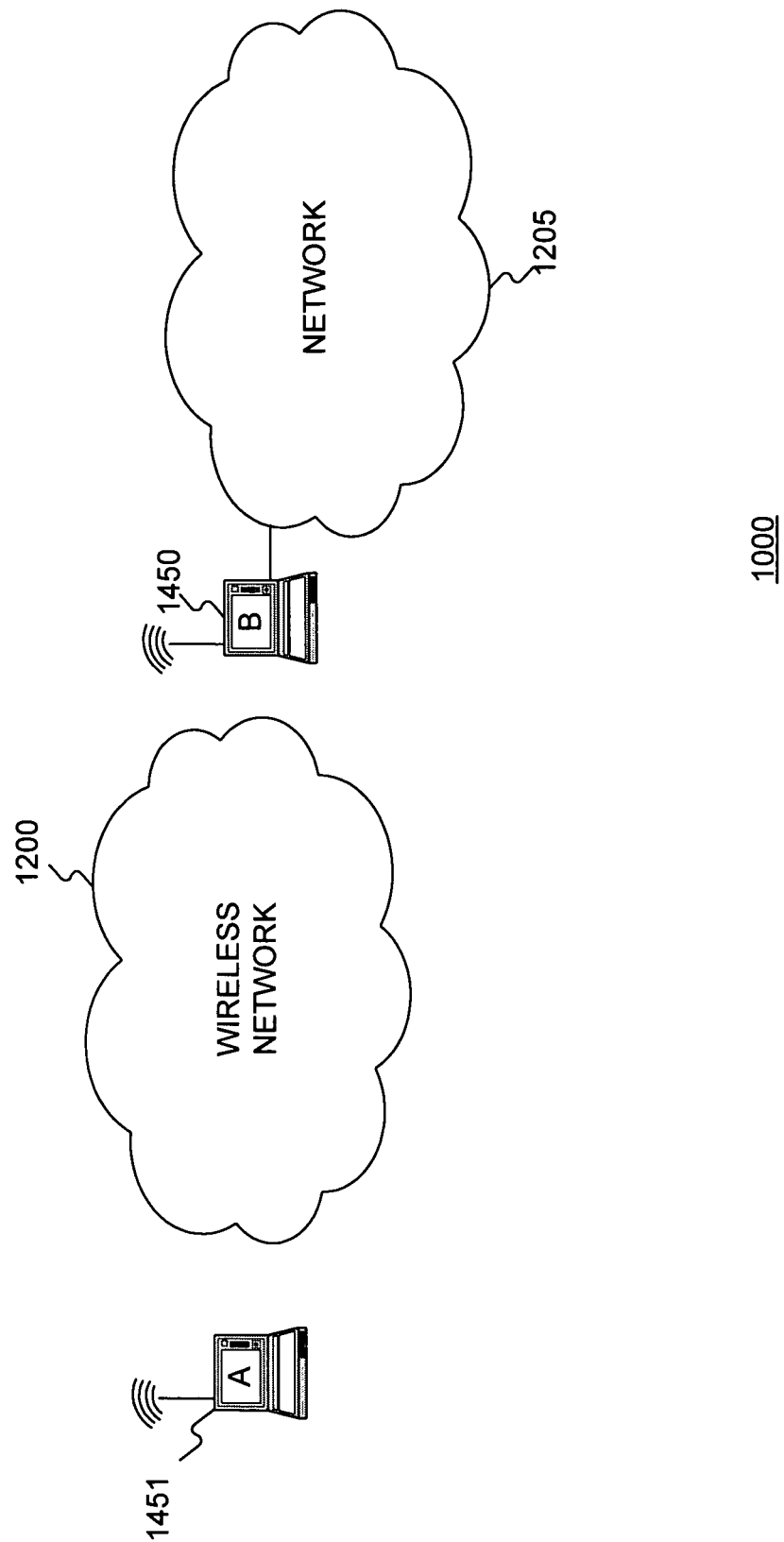
FIG. 1 illustrates an exemplary system environment in accordance with systems and methods consistent with the present invention.

FIG. 1 shows an exemplary system environment 1000 consistent with the system and methods of the present invention. Referring to FIG. 1, the system environment includes a first computer labeled A 1451, a second computer labeled B 1450, a wireless network 1200, and another network 1205. Computer A 1451 communicates wirelessly with computer B 1450 over wireless network 1200.

Figure 2:
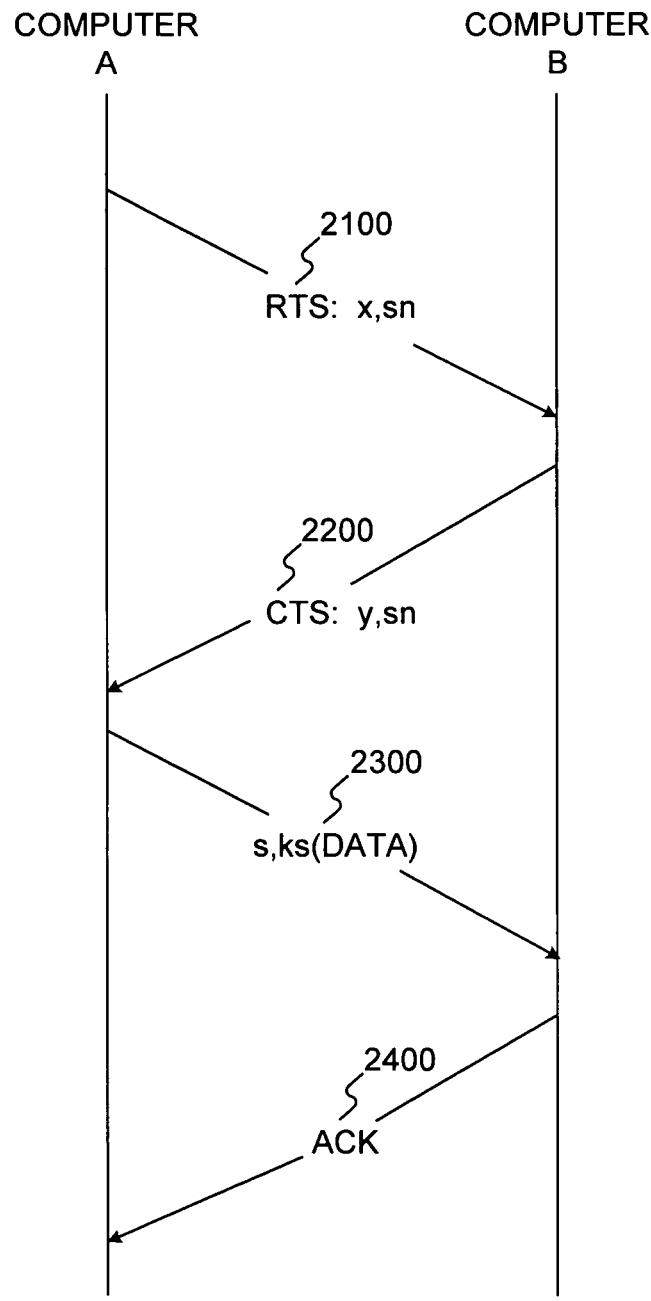
FIG. 2 is a diagram depicting an exemplary message exchange between two computers in accordance with systems and methods consistent with the present invention.

FIG. 2 depicts an exemplary message exchange between computer A 1451 and computer B 1450 when computer A 1451 has data to send to computer B 1450. Referring to FIGS. 1 and 2, computer A 1451 sends an RTS message 2100 over wireless network 1200. RTS message 2100 includes a random integer (labeled x) and a sequence number (labeled sn), both of which are described in greater detail below. After computer B 1450 receives RTS message 2100, computer B 1450 replies with a CTS message 2200 that includes a random number (labeled y) and the previously received sequence number (sn). Each of computers A and B separately determines an identical encryption key (also referred to as a shared secret key or cryptographic key) based on the random integers x and y. As such, each of computers A and B determines the same shared secret key based on the random integers x and y, with the shared secret being stored at each of computers A and B for later use during encryption and decryption. For example, computers A and B may use the well-known Diffie-Hellman key exchange to determine a shared secret key. Each of computers A and B then stores the determined shared secret key along with its corresponding sequence number (sn), as a means of indexing the stored secret key(s).

One of ordinary skill will recognize that well-known algorithms can be used to exchange and/or calculate a secret cryptographic key. Such algorithms may include the Diffie-Hellman key exchange, which is described in RFC-2412, titled "The OAKLEY Key Determination Protocol," November 1998, and the Internet Key Exchange (IKE), which is described in RFC-2409, November 1998. Moreover, other well-known cryptographic key algorithms may by used including one or more of the following: an extended Diffie-Hellman algorithm, a Hughes variant of the Diffie-Hellman algorithm, a Shamir's Three-Pass protocol, a COMSET algorithm, an Encrypted Key Exchange algorithm, or a Fortified Key Negotiation algorithm.

Computer A 1451 may then send Data message 2300 to computer B 1450. Data message 2300 includes a data payload portion that is encrypted (the parenthesis in FIG. 2 represents that the "DATA" is encrypted) with a shared secret key corresponding to a sequence number labeled "s" 2300, which is also included in Data message 2300. Computer B then responds with ACK message 2400 indicating that Data message 2300 has been granted access to the wireless media (e.g., the network).

The sequence number "s" of Data message 2300 may represent the same sequence number "sn" of the immediately previous messages 2100 and 2200. The sequence number is thus determined synchronously with receipt of the RTS and CTS messages. Alternatively, the sequence number "s" may be different representing another sequence number and shared secret key from another RTS and CTS message exchange (not shown). For example, computers A and B may determine a shared secret key corresponding to sequence number equal to the value 2 (e.g., sn=2) by exchanging RTS 2100 and CTS 2200 messages. Data message 2300 can include a sequence number equal to the value 1 (e.g., s=1). The corresponding shared secret key corresponding to the sequence number 1 may have been determined asynchronously, i.e., before the message exchange depicted in FIG. 2.

Shared secret keys may be determined by computers A and B by sending RTS and CTS messages with corresponding random integers X, Y, and sequence numbers. Computers A and B can each determine a shared secret key based on random integers included in those messages. The determined shared secret key and corresponding sequence number included in those messages may then be stored at each of computers A and B.

Figure 3:
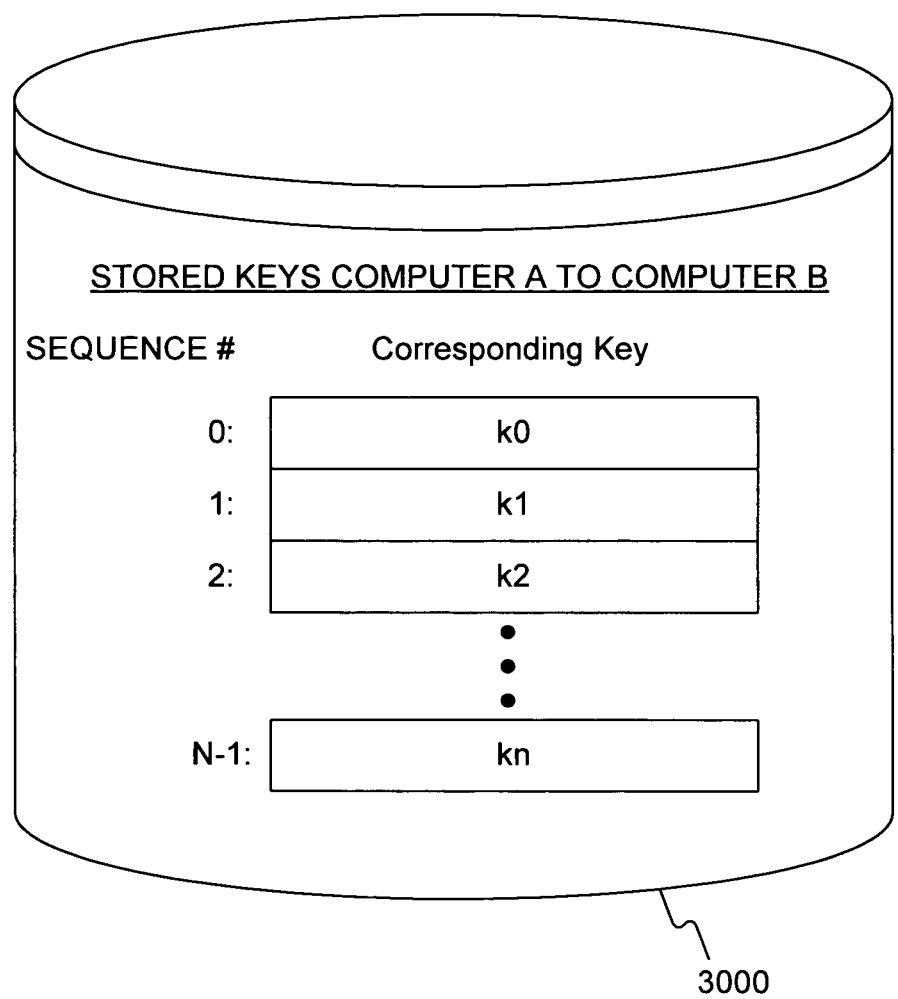
FIG. 3 is an exemplary database storing encryption keys and corresponding sequence numbers in accordance with systems and methods consistent with the present invention.

FIG. 3 depicts a database 3000 that stores shared secret key(s) indexed by sequence number. Referring to FIG. 3, sequence number 0 corresponds to shared secret key k0; sequence number 1 corresponds to shared secret k1; and so forth through the stored shared secrets. Database 3000 may be stored at computer A 1451. Since computer B 1450 must decrypt data received from A, computer B 1450 may also store in a database the same shared secret keys and corresponding sequence numbers depicted in database 3000. Computer A and B may each store the same set of shared secret keys for sending data from computer A to computer B.

In one embodiment, computers A and B may each store another set of shared secret keys for sending data from computer B to computer A. Likewise, if a third computer C is introduced, additional sets of shared secret keys may need to be stored (e.g., keys for Data messages from computer A to computer B, keys for Data messages from computer B to computer A, keys for Data messages from computer C to computer A, and keys for Data messages from computer C to computer B).

Referring to FIGS. 1-3, when computer A 1451 is ready to send data as part of Data message 2300, computer A 1451 selects a shared secret key and corresponding sequence number both of which are stored in database 3000. For example, computer A 1451 may select shared secret key k0 and corresponding sequence number 0. Computer A then encrypts the data payload of Data message 2300 using shared secret key k0. Computer A then sends DATA message 2300 that includes the sequence number 0 and the data payload encrypted with key k0. When computer B 1450 receives Data message 2300, it reads the sequence number 0, identifies the corresponding shared secret key k0, and then decrypts the received data payload using the shared secret key k0. Computer B then sends ACK message 2400 to computer A 1451. ACK message 2400 represents that computer A 1451 has been granted access to the wireless media and/or computer B 1450. Accordingly, systems and methods consistent with the above embodiment of the present invention provide enhanced security in a wireless MAC message exchange.

One of ordinary skill in the art would understand encryption and decryption techniques that encrypt data using a shared secret key are known and available, such as the Advanced Encryption Standard, documented in Federal Information Processing Standards Publication 197, titled "Specification for the ADVANCED ENCRYPTION STANDARD (AES)", dated Nov. 26, 2001. The term "encryption"

means to transform data from an intelligible form (plaintext) into an unintelligible form (cipher text) to provide some level of privacy, or to provide other well-known cryptographic services such as authentication, non-repudiation, and the like. Encryption may range from a simple coding technique to more robust algorithms that provide a high level of privacy. The term "key" (also referred to as cryptographic key or a shared secret key) means a sequence of symbols, such as bits, that function to vary the transformation performed by an encryption or decryption algorithm. A key can be "public" (e.g., a "public key") if it is publicly-disclosed or "private" (also referred to as secret) if the key is not publicly disclosed (not shared).

Although computer A 1451 is depicted as a stand-alone computer or data processor, computer A 1451 may be connected to another network as is the case with computer B 1450. Moreover, computer A 1451 and/or computer B 1450 may further function as a gateway computer that enables access to other wired or wireless networks.

Figure 4:
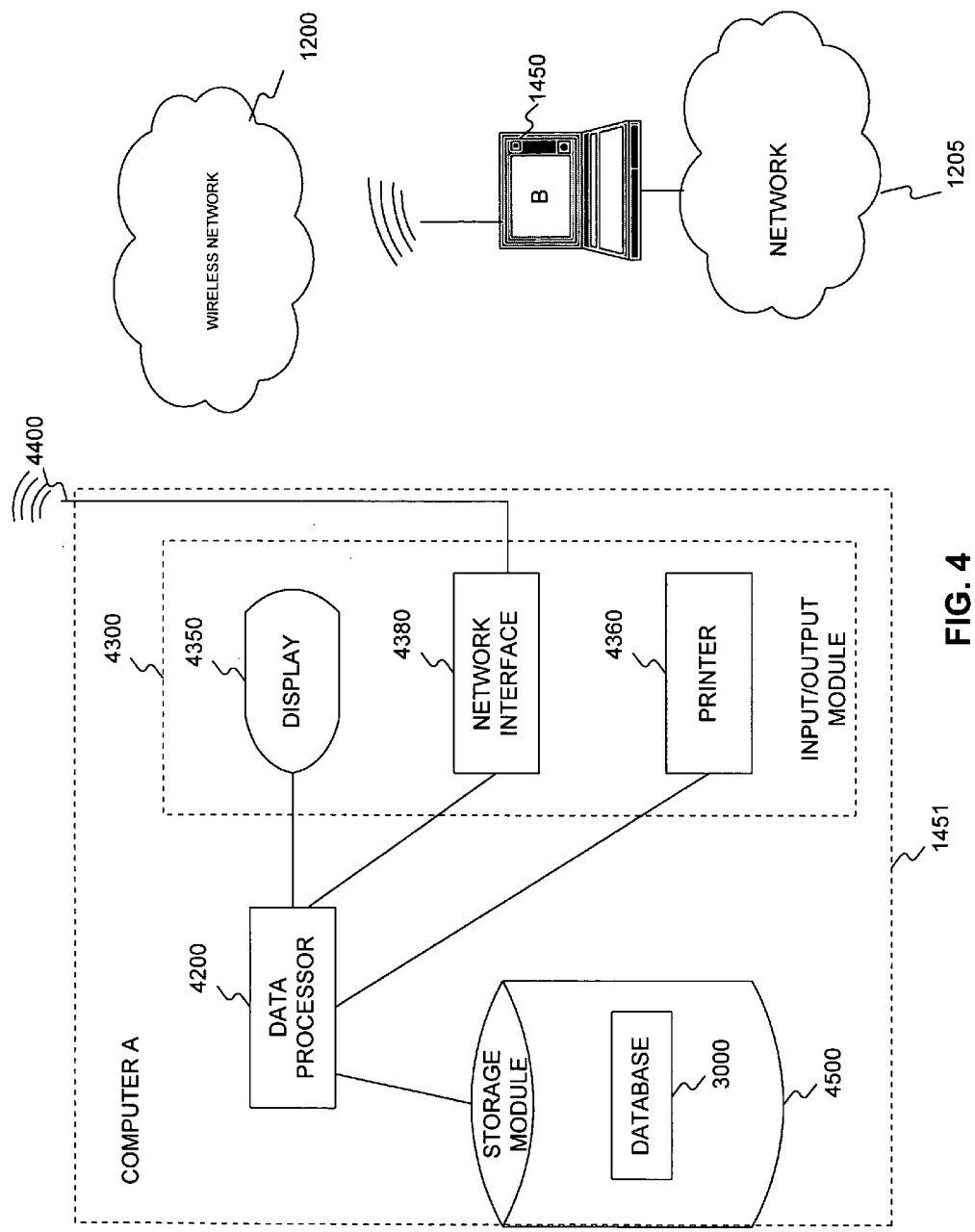
FIG. 4 illustrates another exemplary system environment in accordance with systems and methods consistent with the present invention.

FIG. 4 depicts the exemplary system environment of FIG. 1 in greater detail. Referring to FIG. 4, the system environment includes computer A 1451, computer B 1450, network 1200, and network 1205. Computer A further includes a data processor 4200, an input/output module 4300, a storage module 4500, and an antenna 4400. Input/output module 4300 further includes a display 4350, a network interface 4380, and a printer 4360.

Data processor 4200 may include, for example, one or more of the following: a central processing unit, a co-processor, memory, registers, or other processing devices and systems as appropriate. Although computer A 1451 is generally described in terms of data processor 4200, data processor 2200 may also be incorporated into any other processing or communication device including, for example, a router, a gateway, a bridge, a handheld device, a mobile phone, and/or a switch.

Input/output module 4300 may be implemented with a variety of devices to receive an input and/or provide an output. Some of these devices may include, for example, a keyboard, a mouse, an input storage device, display 4350, and/or printer 4360. Furthermore, input/output module 4300 may provide any input to data processor 4200 and provide any output, such as a radio frequency (RF) output for wireless transmission through antenna 4400. Network interface 4380 may permit computer A 1451 to communicate through a network, such as network 1200. For example, network interface 4380 may be embodied as an Ethernet network interface card or a wireless LAN interface card, such as the Cisco Aironet 350, Verizon AirCard® 555, or any other commercially available card compatible with a wireless standard (e.g., IEEE 802.11 or the like).

Storage module 4500 may be embodied with a variety of components or subsystems capable of providing storage including, for example, a hard drive, an optical drive, a general-purpose storage device, a removable storage device, and/or memory. Moreover, storage module 4500 may include database 3000 for storing one or more shared secrets and corresponding sequence numbers. Although storage module 4500 is illustrated in FIG. 4 as being separate or independent from data processor 4200, storage module 4500 and data processor 4200 may be implemented as part of a single platform or system.

Antenna 4400 functions as an RF interface that permits energy to be transmitted to and/or received from another device, such a computer B. In one embodiment, antenna 4400 is coupled to network interface 4380, which includes an IEEE 802.11 wireless network interface card.

Computer B may be embodied similar to computer A 1451. In one embodiment, computer B serves as a wireless access point providing a gateway to another network 1205. Network 1205 may be a wireless network, such as a wireless network compatible with IEEE 802.11 or, alternatively, a wired network. In other embodiments, computer B does not serve as a gateway and thus functions to receive messages from and send messages to computer A 1451.

Network 1200 may function as a wireless communication medium that enables a wireless exchange. In one embodiment, network 1200 serves to support an IEEE 802.11 wireless network (e.g., 802.11b), such that a computer configured with a wireless network interface card can exchange data based on the IEEE 802.11 standard. Although IEEE 802.11 is referred to herein, systems and methods consistent with the present invention are not limited to any particular wireless standard and may be used to enhance the security of any wired and/or wireless media access.

Network 1205 may function as a communication medium and may include, alone or in any suitable combination, a telephony-based network, a local area network (LAN), a wide area network (WAN), a dedicated intranet, the Internet, a wireless network, or a bus. Further, any suitable combination of wired and/or wireless components and systems may be incorporated into the communication channels of network 1205. Although networks 1205 and 1200 are depicted as separate, in some embodiments, networks 1205 and 1200 can be part of the same network.

Figure 5:
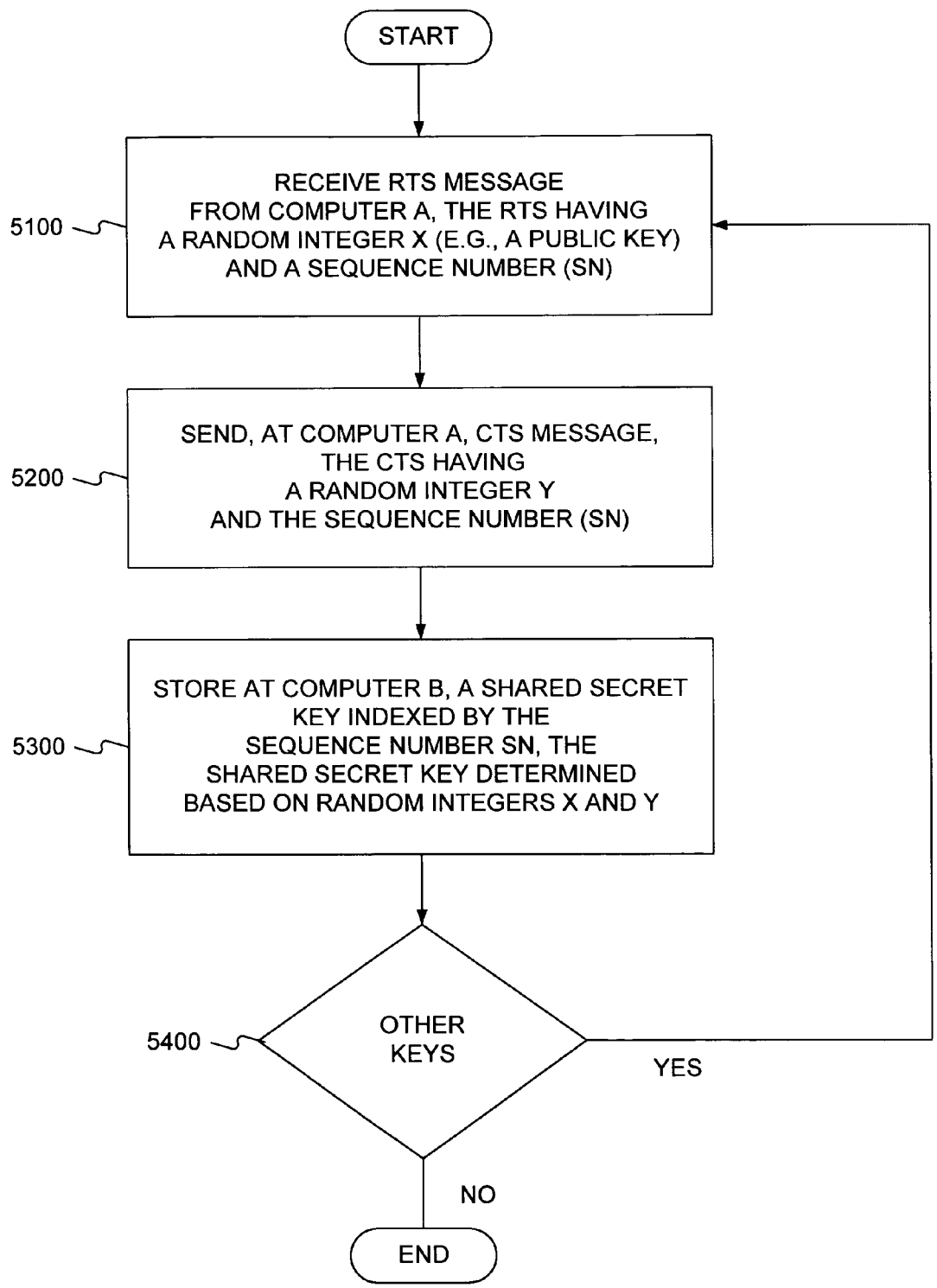
FIG. 5 is a flowchart showing exemplary steps for storing one or more encryption keys in accordance with systems and methods consistent with the present invention.

FIG. 5 depicts a flowchart with exemplary steps for determining one or more shared secret keys and corresponding sequence numbers in accordance with one embodiment of the present invention. Referring to FIGS. 2, 4, and 5, computer B 1450 receives RTS message 2100 from computer A 1451, with RTS message 2100 including a random integer X and a sequence number SN (step 5100). Computer B 1450 then responds to RTS message 2100 by sending CTS message 2200 that includes another random integer Y and the same sequence number SN received in step 5100 (step 5200). Computer B 1450 then determines a shared secret key based on the random integers X and Y and stores in database 3000 the shared secret with its corresponding sequence number SN (step 5300). If another shared secret key is to be determined (YES at 5400), steps 5100-5300 are repeated. If not (NO at step 5400), computer B may proceed to use the shared secret keys stored in database 3000.

Computer A (or data processor 4200 therein) may have data, such as Internet Protocol (IP) packets, for transmission to computer B, network 1200, and/or network 1200. When that is the case, computer A 1451 may send RTS message 2100 from computer A 1451 to computer B (step 5100). In one embodiment, RTS message 2100 comprises an IEEE 802.11-1999 compliant RTS message modified to include a sequence number and a random integer. As noted above, computer A may randomly determine integer X. For example, random integer X may take the following form:

1010 1010 1010 . . . 0000 1111

The random integer X may be a large random integer (e.g., at least 100 or 1,000 bits long), such as one that can be used as a public key in a Diffie-Hellman key exchange. Moreover, computer A may determine the integer X such that it is unique, serving as an index that uniquely identifies a shared secret key stored in database 3000. For example, computer A 1451 may search database 3000 to determine whether the random integer X is unique (e.g., not stored and not in use).

When computer B 1450 receives RTS message 2100, computer B then sends CTS message 2200 by determining random integer Y and echoing back the same sequence number received in step 5100 (step 5200). In one embodiment, CTS message 2200 comprises an IEEE 802.11-1999 CTS message modified to include a sequence number and a random integer. As above, computer B may also randomly determine integer Y. These random numbers may be by preference truly, physically random. There are many techniques known to one of ordinary skill in the art for finding physically random numbers, including measurement of thermal noise in electronics. Alternatively, the random numbers may be pseudorandom, i.e., be calculated by an algorithm but have a resulting sequence that is very hard to predict. Moreover, each computing entity in this exchange may determine its own "local" random number without regard to what the other computing entity may determine. The random integer Y is a large random integer, such as one that can be used as input for a cryptographic algorithm. For example, random integer Y may take the following form:

0101 0000 1111 . . . 0101 1010.

Computer B 1451 may then proceed to determine a shared secret key based on the random integers X and Y. Meanwhile, computer A 1451 may determine the same shared secret based on random integers X and Y. Although other mechanisms of exchanging keys and determining keys can be used, in one embodiment, a Diffie-Hellman key exchange (RFC-2412) is the key exchange mechanism. When that is the case, computer B determines its shared secret key based on not only random integers X and Y, but also a private key known only to computer B. Meanwhile, computer A 1451 determines its shared secret key based random integers X and Y as well as its own private key which is known only to computer A 1451. Computers A and B each store the same shared secret key indexed by the corresponding sequence number (step 3300).

If additional shared secret keys are required (YES at 5400), computer A 1451 may repeat steps 5100-5300 by sending as part of another RTS message (not shown), another random integer, and another sequence number. In one embodiment, computer A 1451 determines a plurality of shared secret keys, any of which can be used to encrypt a data payload transmitted in the Data message 2300. Moreover, computer A 1451 may use a different one of the shared secret keys each time DATA message 2300 is sent. Alternatively, the shared secret key can be changed periodically, such as every few seconds, minutes, hours, or days. For example, computer A 1451 may encrypt the data portion of DATA message 2300. Later, after another RTS CTS message exchange, computer A 1451 may encrypt a subsequent DATA message with a different shared secret key, e.g., shared secret key k3 (FIG. 3). On the receive-side, computer B can identify an appropriate shared secret key based on the sequence number included in DATA message 230. Computer B can then decrypt DATA message 2300 with the identified shared secret key.

One of ordinary skill in the art would understand that DATA message 2300 may encrypt anything including Internet Protocol (IP) packets, datagrams, cells, frames, files, calls, and encryption keys.

If additional shared secret keys are not required (NO at 5400), computer B then stores the single shared secret key and its corresponding sequence number, while computer A 1451 would also have an identical shared secret key and corresponding sequence number stored therein.

Figure 6:
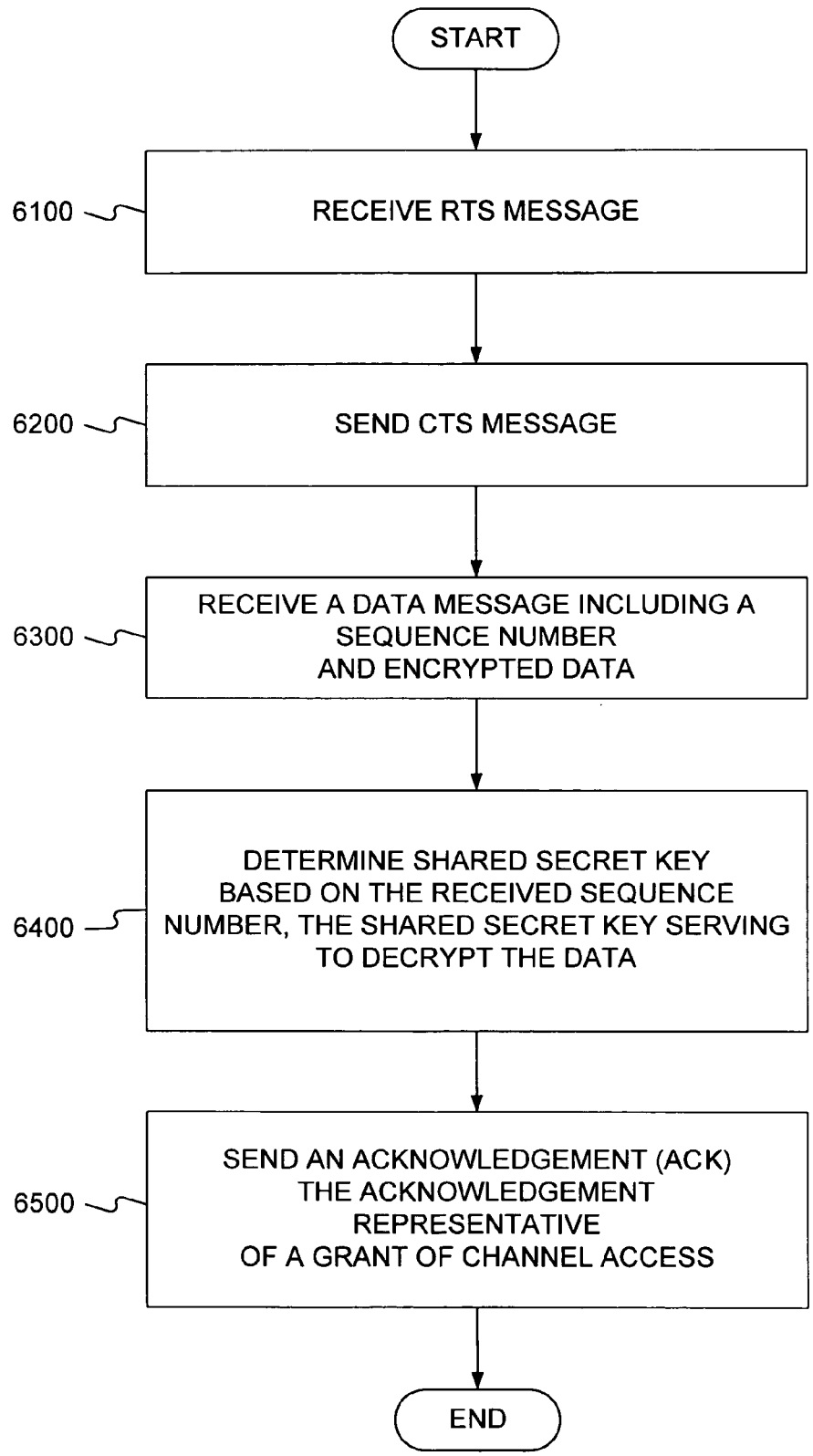
FIG. 6 is a flowchart showing exemplary steps for determining a shared secret key for use in decrypting a message in accordance with systems and methods consistent with the present invention.

FIG. 6 depicts a flowchart with exemplary steps for determining a shared secret key for use in decrypting a message in accordance with one embodiment of the present invention. Referring to FIG. 6, after receiving RTS message 2100 sent by computer A 1450 (step 6100), computer B responds by sending CTS message 2200 (step 6200). Computer B then receives Data message 2300 sent by computer A 1451, with Data message 2300 including a sequence number and encrypted data (step 6300). To decrypt the data portion of message 2300, computer B determines a shared secret key based on the received sequence number (step 6400). Computer B then sends ACK message 2400 (step 6500).

To send RTS message 2100, computer A 1451 sends RTS message 2100 through network interface 4380 and antenna 4400. RTS message 2100 includes a random integer X and a sequence number S. The RTS message 2100 is received as an RF signal at computer B through an antenna and demodulated by a wireless network interface, such as a wireless network interface card compatible with IEEE 802.11. When RTS message 2100 is received by computer B, it responds by sending CTS message 2200 (step 6200) through a wireless network interface and an antenna. CTS message 2200 includes a random integer Y and the same sequence number received in RTS message 2100.

At computer A 1451, it receives CTS message 2200 sent by computer B as an RF signal which is subsequently demodulated using wireless network interface 4380. CTS message 2200 triggers computer A 1451 to send data Data message(s) 2300. Computer A then encrypts the data payload portion of Data message 2300 using a shared secret key. The shared secret key may be determined from the random integers X and Y or may be determined by simply selecting a secret key stored in database 3000. In both cases, the computer A 1451 shared secret key is used with an encryption algorithm, such as DES (Digital Encryption Algorithm), Triple DES, Blowfish, AES, or any other well-known encryption algorithm. The sequence number included in Data message 2300 may be unencrypted clear text. Computer A then forms and sends Data message 2300 through wireless network interface 2380 and antenna 4400, which transmits, e.g., an IEEE 802.11b compatible RF signal.

To receive the computer A Data message 2300 including a sequence number and encrypted data (step 6300), computer B receives an RF signal through an antenna and demodulates the signal at a wireless network interface. Computer B then identifies the sequence number in Data message 2300, determines the shared secret key corresponding to the identified sequence number, and decrypts the data payload portion of DATA message 2300 using the determined shared secret.

To decrypt the data portion of message 2300, computer B determines a shared secret key based on the received sequence number (step 6400). As noted above, the sequence number may identify a shared secret, which may be stored in database 3000. If database 3000 does not include a shared secret for the received sequence number, computer B may disregard DATA message 2300, not granting media access to computer A 1451. Alternatively, computer B may send an error message indicating that another sequence number should be sent. In one embodiment, if computer A 1451 does not receive an ACK message within a predetermined period of time (e.g., 500 milliseconds), computer A 1451 automatically resends Data message 2300 using a different sequence number that is stored in database 3000.

To send ACK message 2400 (step 6500), computer B sends ACK message 2400 through a network interface and an antenna. ACK message 2400 represents that computer B has granted wireless media access to computer A 1451, enabling computer B to decrypt, process Data message 2400, and/or forward Data message 2400 to network 1205. In some embodiments, computer B is embodied as a wireless access point in an IEEE 802.11 network. When that as the case, computer B functions as a gateway accepting Data messages from computer A 1451 and forwarding the Data message (or data payload) to a destination computer or network, such as network 1205.

Although encryption is described above, other processing may be performed instead including decoding, coding, compression, or decompression.

Figure 7:
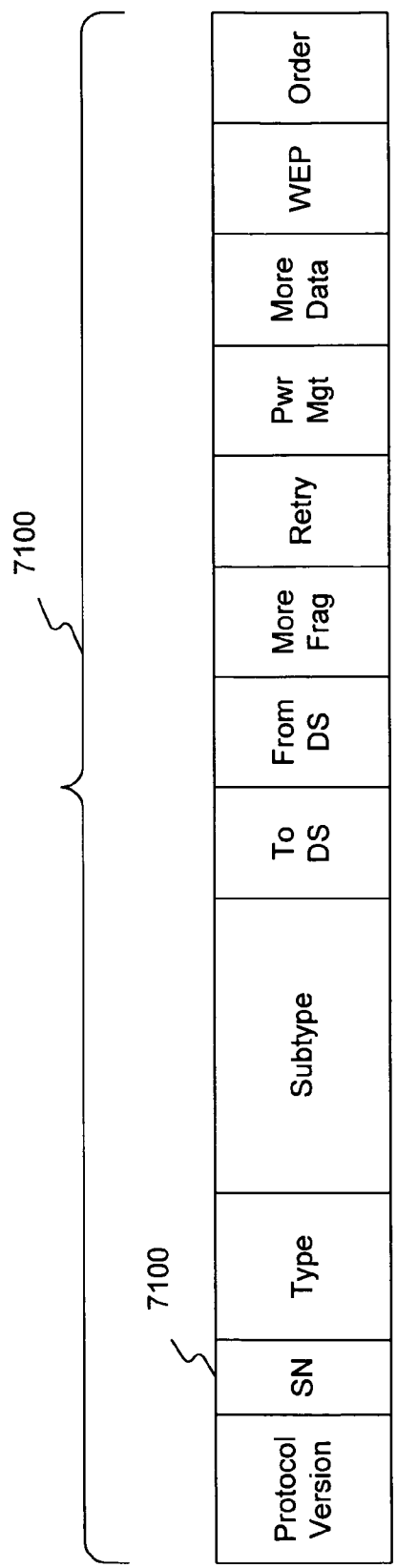
FIG. 7 is an exemplary Data message in accordance with systems and methods consistent with the present invention.
Figure 8:
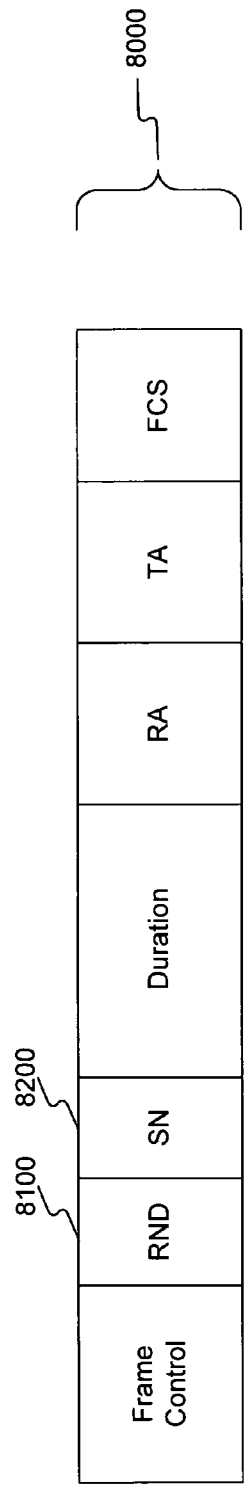
FIG. 8 is an exemplary Request to Send (RTS) message in accordance with systems and methods consistent with the present invention.
Figure 9:
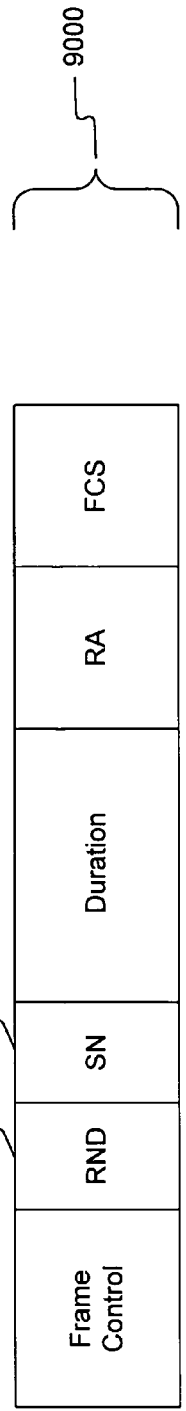
FIG. 9 is an exemplary Clear to Send (CTS) message in accordance with systems and methods consistent with the present invention.
Figure 10:
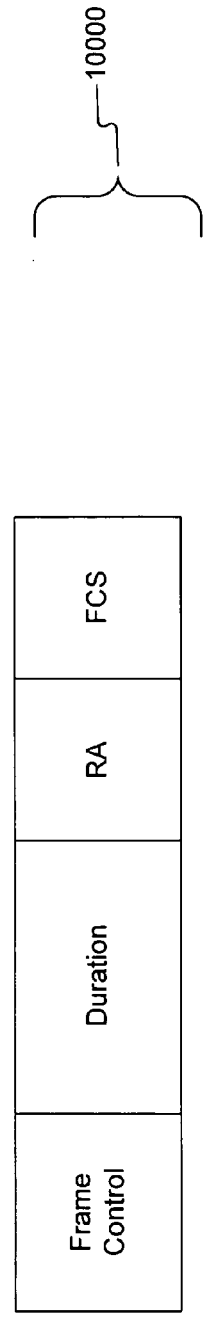
FIG. 10 is an exemplary Acknowledgement (ACK) message in accordance with systems and methods consistent with the present invention.
Figure 11:
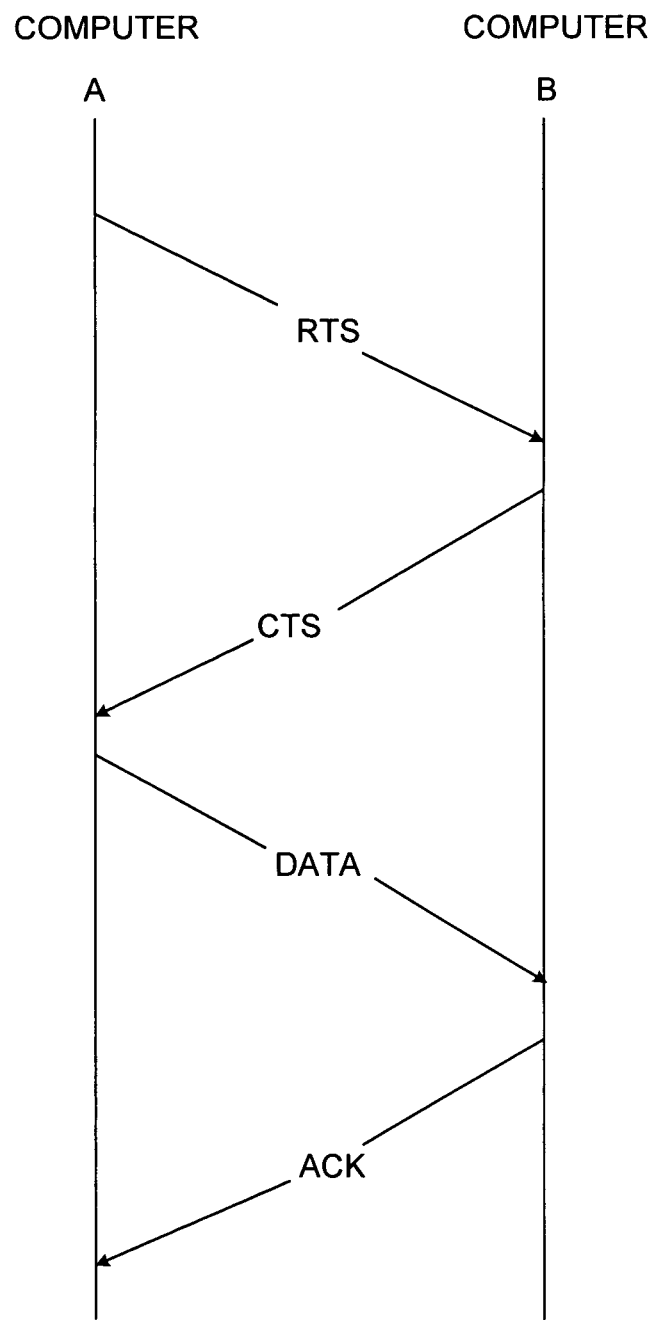
FIG. 11 is a diagram depicting a known message exchange between two computers.

FIG. 7 depicts an IEEE 802.11-1999 DATA message 7000 (also referred to as a Data frame) modified with the addition of a sequence number field 7100. FIG. 8 depicts an exemplary IEEE 802.11-1999 RTS message 8000 modified with the addition of a random number field 8100 and a sequence number field 8200. FIG. 9 depicts an exemplary IEEE 802.11-1999 CTS message 9000 modified with the addition of a random number field 9100 and a sequence number field 9200. FIG. 10 depicts an exemplary IEEE 802.11-1999 ACK message. In one embodiment, messages 7000-10000 are used as the messages 2100-2400 (FIG. 2).

The systems disclosed herein may be embodied in various forms including, for example, a data processor, such as a computer that also includes a database. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Furthermore, although the above description has referred to embodiments in a wireless network environment based on radio frequency (RF) transmission, systems and methods consistent with the present invention may be employed in other forms of wireless networks, e.g., those based on optical or acoustic transmissions, or in any other network in which messages are exchanged as a part of the medium access control for that network.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include, for example, machine code, such as produced by a compiler, and files containing a high level code that can be executed by the computer using an interpreter.

What is claimed is:

1. A method of medium access control comprising:
receiving, by a first computer from a second computer, a first message including a first random integer and a first sequence number;
sending, by the first computer to the second computer, a second message including a second random integer and the first sequence number;
determining a first encryption key based on the first random integer and the second random integer;
associating the first encryption key with the first sequence number; and
receiving, by the first computer from the second computer, a third message including a second sequence number and data, the second sequence number identifying a second encryption key capable of decoding the third message.

2. The method of claim 1, further comprising:
determining a plurality of encryption keys, one of which is the first encryption key, the plurality of keys being indexed by corresponding sequence numbers.

3. The method of claim 2, further comprising decoding the third message using, as the second encryption key, one of the plurality of encryption keys different than the first encryption key.

4. The method of claim 1, further comprising decoding the third message using, as the second encryption key, the first encryption key.

5. The method of claim 4, further comprising determining the first encryption key by searching a database for the first encryption key based on the first sequence number.

6. The method of claim 4, further comprising determining the first encryption key by selecting the first encryption key based on the first sequence number, the first encryption key being predetermined.

7. The method of claim 1, wherein the first message comprises a request-to-send message.

8. The method of claim 1, wherein the second message comprises a clear-to-send message.

9. The method of claim 1, wherein the third message comprises a data message.

10. The method of claim 1, further comprising:
decoding the third message.

11. The method of claim 10, wherein decoding the third message comprises decrypting a payload of the third message based on the second encryption key.

12. The method of claim 1, further comprising:
determining, asynchronously, the second encryption key before the first message is received and the second message is sent.

13. The method of claim 1, further comprising:
determining, synchronously, the second encryption key after the first message is received and the second message is sent.

14. The method of claim 1, wherein the first encryption key is indexed with the first sequence number.

15. The method of claim 1, wherein determining the first encryption key comprises:
determining the first encryption key based on a Diffie-Hellman key exchange.

16. The method of claim 1, further comprising:
using the first, second, and third messages as the medium access control of a wireless network.

17. A method of medium access control in a wireless network comprising:
receiving, by a first computer from a second computer, a request-to-send message, the request-to-send message including a first random integer and a first sequence number;
sending, by the first computer to the second computer and in response to the received request-to-send message, a clear-to-send message including a second random integer and the first sequence number, the first and second random integers being representative of public keys used to determine a shared secret key;
associating the shared secret key with the first sequence number;
receiving, by the first computer from the second computer, a data message including a second sequence number and data, the data being encrypted with a second encryption key identifiable by the second sequence number; and sending, by the first computer to the second computer and in response to the received data message, an acknowledgement message.

18. The method of claim 17, further comprising:
using, as the first sequence number, the second sequence number.

19. The method of claim 17, further comprising:
using, as the first sequence number, another sequence number different than the second sequence number.

20. A method of medium access control comprising:
receiving, by a first computer from a second computer, a first message including a first random integer and a first sequence number;
sending, by the first computer to the second computer, a second message including a second random integer and the first sequence number; and
receiving, by the first computer from the second computer, a third message including a first frame of data, the first frame of data being encrypted by a first encryption key determined based on the first and second random integers, the first encryption key being associated with the first sequence number.

21. The method of claim 20, wherein the first message comprises a request-to-send message.

22. The method of claim 20, wherein the second message comprises a clear-to-send message.

23. The method of claim 20, further comprising:
using the first, second, and third messages as a medium access control of a wireless network.

24. The method of claim 20, further comprising:
using, as the first message, a request-to-send message, the request-to-send message providing media access control.

25. The method of claim 20, further comprising:
using, as the second message, a clear-to-send message, the clear-to-send message providing media access control.

26. The method of claim 20, further comprising:
receiving a fourth message including a second frame of data, the second frame of data being encrypted by the first encryption key.

27. The method of claim 20, further comprising:
receiving a fourth message including a second frame of data, the second frame of data being encrypted by a second encryption key.

28. The method of claim 20, further comprising:
determining, asynchronously, the first encryption key from the first random integer and the second random integer, such that the first encryption key is indexed with the sequence number.

29. The method of claim 28, wherein the third message comprises data and the sequence number, the sequence number being representative of the first encryption key.

30. A system for medium access control, the system comprising:
a processor; and
a memory,
wherein the processor and the memory are configured to perform a method comprising:
receiving, by a first computer from a second computer, a first message including a first random integer and a first sequence number;
sending, by the first computer to the second computer, a second message including a second random integer and the first sequence number;
determining a first encryption key based on the first random integer and the second random integer;
associating the first encryption key with the first sequence number; and
receiving, by the first computer from the second computer, a third message including a second sequence number and data, the second sequence number identifying a second encryption key capable of decoding the third message.

31. The system of claim 30, further comprising:
determining a plurality of encryption keys, one of which is the first encryption key, the plurality of encryption keys being indexed by corresponding sequence numbers.

32. The system of claim 31, further comprising decoding the third message using, as the second encryption key, one of the plurality of encryption keys different than the first encryption key.

33. The system of claim 30, further comprising decoding the third message using, as the second encryption key, the first encryption key.

34. The system of claim 30, wherein the first message comprises a request-to-send message.

35. The system of claim 30, wherein the second message comprises a clear-to-send message.

36. The system of claim 30, wherein the third message comprises a data message.

37. A non-transitory computer-readable medium containing instructions to configure a data processor to perform a method of medium access control comprising:
receiving a first message, by a first computer from a second computer, the first message including a first random integer and a first sequence number;
sending a second message, by the first computer to the second computer, the second message including a second random integer and the first sequence number;
determining a first encryption key based on the first random integer and the second random integer;
associating the first encryption key with the first sequence number; and
receiving, by the first computer from the second computer, a third message including a second sequence number and data, the second sequence number identifying a second encryption key capable of decoding the third message.

38. The computer-readable medium of claim 37, further comprising:
determining a plurality of encryption keys, one of which is the first encryption key, the plurality of encryption keys being indexed by corresponding sequence numbers.

39. The computer-readable medium of claim 38, further comprising decoding the third message using, as the second encryption key, one of the plurality of encryption keys different than the first encryption key.

40. The computer-readable medium of claim 37, further comprising decoding the third message using, as the second encryption key, the first encryption key.

41. The computer-readable medium of claim 37, wherein the first message comprises a request-to-send message.

42. The computer-readable medium of claim 37, wherein the second message comprises a clear-to-send message.

43. The computer-readable medium of claim 37, wherein the third message comprises a data message.

44. A system for medium access control in a wireless network, the system comprising:
a processor; and
a memory, wherein the processor and the memory are configured to perform a method comprising:
 receiving, by a first computer from a second computer, a request-to-send message, the request-to-send message including a first random integer and a first sequence number;
 sending, by the first computer to the second computer and in response to the received request-to-send message, a clear-to-send message including a second random integer and the first sequence number, the first and second random integers being representative of public keys used to determine a shared secret key;
 associating the shared secret key with the first sequence number;
 receiving, by the first computer from the second computer, a data message including a second sequence number and data, the data being encrypted with a second encryption key identifiable by the second sequence number; and
 sending, by the first computer to the second computer and in response to the received data message, an acknowledgement message.

45. A non-transitory computer-readable medium containing instructions to configure a data processor to perform a method of medium access control in a wireless network comprising:
 receiving, by a first computer from a second computer, a request-to-send message, the request-to-send message including a first random integer and a first sequence number;
 sending, by a first computer to the second computer and in response to the received request-to-send message, a clear-to-send message including a second random integer and the first sequence number, the first and second random integers being representative of public keys used to determine a shared secret key;
 associating the shared secret key with the first sequence number;
 receiving, by the first computer from the second computer, a data message including a second sequence number and data encrypted with a second encryption key identifiable by the second sequence number; and
 sending, by the first computer to the second computer and in response to the received data message, an acknowledgement message.

46. A system for medium access control, the system comprising:
 a processor; and
 a memory,
 wherein the processor and the memory are configured to perform a method comprising:
 receiving, by a first computer from a second computer, a first message including a first random integer and a first sequence number;
 sending, by the first computer to the second computer, a second message including a second random integer and the first sequence number; and
 receiving, by the first computer from the second computer, a third message including a first frame of data, the first frame of data being encrypted by a first encryption key determined based on the first and second random integers, the first encryption key being associated with the first sequence number.

47. The system of claim 46, wherein the first message comprises a request-to-send message.

48. The system of claim 46, wherein the second message comprises a clear-to-send message.

49. The system of claim 46, further comprising:
 using the first, second, and third messages as the medium access control of a wireless network.

50. The system of claim 46, further comprising:
 receiving a fourth message including a second frame of data, the second frame of data being encrypted by the first encryption key.

51. The system of claim 46, further comprising:
 receiving a fourth message including a second frame of data, the second frame of data being encrypted by a second encryption key.

52. The system of claim 46, further comprising:
 determining, asynchronously, the first encryption key from the first random integer and the second random integer, such that the first encryption key is indexed with the sequence number.

53. The system of claim 52, wherein the third message comprises data and the sequence number, the sequence number being representative of the first encryption key.

54. A non-transitory computer-readable medium containing instructions to configure a data processor to perform a method of medium access control in a wireless network comprising:
 receiving, by a first computer from a second computer, a first message including a first random integer and a first sequence number;
 sending, by the first computer to the second computer, a second message including a second random integer and the first sequence number; and
 receiving, by the first computer from the second computer, a third message including a first frame of data, the first frame of data being encrypted by a first encryption key determined based on the first and second random integers, the first encryption key being associated with the first sequence number.

55. The computer-readable medium of claim 54, wherein the first message comprises a request-to-send message.

56. The computer-readable medium of claim 54, wherein the second message comprises a clear-to-send message.

57. The computer-readable medium of claim 54, further comprising:
 using the first, second, and third messages as the medium access control of a wireless network.

58. The computer-readable medium of claim 54, further comprising:
 receiving a fourth message including a second frame of data, the second frame of data being encrypted by the first encryption key.

59. The computer-readable medium of claim 54, further comprising:
 receiving a fourth message including a second frame of data, the second frame of data being encrypted by a second encryption key.

60. The computer-readable medium of claim 54, further comprising:
 determining, asynchronously, the first encryption key from the first random integer and the second random integer, such that the first encryption key is indexed with the sequence number.

61. The computer-readable medium of claim 60, wherein the third message comprises data and the sequence number, the sequence number being representative of the first encryption key.

62. A system of medium access control in a wireless network comprising:

means for receiving, by a first computer from a second computer, a request-to-send message, the request-to-send message including a first random integer and a first sequence number;

means for sending, by the first computer to the second computer and in response to the received request-to-send message, a clear-to-send message including a second random integer and the first sequence number, the first and second random integers being representative of public keys used to determine a shared secret key;

means for indexing the shared secret key with the first sequence number;

means for receiving, by the first computer from the second computer, a data message including a second sequence number and data, the data being encrypted with a second encryption key identifiable by the second sequence number; and means for sending, by the first computer to the second computer and in response to the received data message, an acknowledgement message.

* * * * *